(12) United States Patent
Oh

(10) Patent No.: US 7,255,315 B2
(45) Date of Patent: Aug. 14, 2007

(54) MOUNTING STRUCTURE FOR SPRINKLERS

(75) Inventor: Seung-il Oh, Seoul (KR)

(73) Assignee: Kofulso Co., Ltd., Incheon-si (KR)

( * ) Notice: Subject to any disclaimer, the term of this patent is extended or adjusted under 35 U.S.C. 154(b) by 181 days.

(21) Appl. No.: 11/066,233

(22) Filed: Feb. 25, 2005

(65) Prior Publication Data

US 2006/0192067 A1   Aug. 31, 2006

(51) Int. Cl.
*E04B 9/10* (2006.01)
*F16L 3/08* (2006.01)

(52) U.S. Cl. .................. 248/342; 248/317; 52/506.07; 169/43

(58) Field of Classification Search ................ 248/342, 248/343, 62, 65, 75, 317; 52/506.07, 715, 52/712; 169/43, 16, 37
See application file for complete search history.

(56) References Cited

U.S. PATENT DOCUMENTS

| 2,375,513 | A |  | 5/1945 | Bach |
| 3,341,909 | A |  | 9/1967 | Havener |
| 3,556,452 | A |  | 1/1971 | Ramsey |
| 3,558,091 | A |  | 1/1971 | Bush |
| 3,608,857 | A |  | 9/1971 | Hibbeler |
| 3,612,461 | A |  | 10/1971 | Brown |
| 3,652,780 | A |  | 3/1972 | Wilson |
| 3,874,035 | A |  | 4/1975 | Schuplin |
| 4,135,692 | A |  | 1/1979 | Ferguson |
| 4,149,693 | A | * | 4/1979 | LoNigro ..................... 248/342 |
| 4,408,428 | A |  | 10/1983 | Brooke et al. |
| 4,544,119 | A |  | 10/1985 | Kellett et al. |
| 4,717,099 | A |  | 1/1988 | Hubbard |
| 4,723,749 | A |  | 2/1988 | Carraro et al. |
| 5,595,363 | A |  | 1/1997 | DeLeebeeck |
| 5,667,181 | A |  | 9/1997 | van Leeuwen et al. |
| 6,260,810 | B1 |  | 7/2001 | Choi |
| 6,341,466 | B1 | * | 1/2002 | Kehoe et al. ................. 52/712 |
| 6,345,800 | B1 |  | 2/2002 | Herst et al. |
| 6,554,231 | B2 | * | 4/2003 | Choi ........................... 248/65 |
| 6,811,130 | B1 | * | 11/2004 | Oh .............................. 248/343 |
| 7,032,690 | B2 | * | 4/2006 | Ramey et al. ................. 175/57 |

FOREIGN PATENT DOCUMENTS

JP            07151269 A  *  6/1995

* cited by examiner

*Primary Examiner*—Anita M. King
(74) *Attorney, Agent, or Firm*—Jacobson Holman PLLC

(57) ABSTRACT

Disclosed herein is a mounting structure for sprinklers. In the sprinkler mounting structure of the present invention, a latitudinal support unit has an elastic unit at each of opposite ends thereof, so that the latitudinal support unit can be reliably mounted to a pair of longitudinal support units merely by pushing the latitudinal support unit downwards on the longitudinal support unit. Furthermore, a mounting bracket, which is movably fitted over the latitudinal support unit to be adjusted in position, firmly holds a sprinkler reducer only by the rotation of a locking unit, coupled to the mounting bracket, in a predetermined direction.

15 Claims, 16 Drawing Sheets

MOUNTING STRUCTURE FOR SPRINKLERS

BACKGROUND OF THE INVENTION

1. Field of the Invention

The present invention relates generally to mounting structures for sprinklers and, more particularly, to a mounting structure for sprinklers by which a sprinkler reducer and a plurality of support units to support a sprinkler head are easily mounted at predetermined positions.

2. Description of the Related Art

Generally, a sprinkler reducer, to which a sprinkler head is coupled, is supported by a reducer mounting unit which is mounted to a latitudinal support unit that is provided on a ceiling plate in a building to arrange various wires on the ceiling plate. The latitudinal support unit is supported at opposite ends thereof by a longitudinal support unit.

FIG. 1 is an exploded perspective view showing a conventional mounting structure for sprinklers. As shown in FIG. 1, the conventional sprinkler mounting structure includes a pair of longitudinal support units 1 which are mounted on the ceiling plate of a building, and a latitudinal support unit 2 which is supported on the longitudinal support unit 1. The sprinkler mounting structure further includes a vertical bracket 3 which is coupled to an upper part of the longitudinal support unit 1 by a locking bolt 3a that is tightened into a lower end of the vertical bracket 3. The latitudinal support unit 2 is mounted to an upper end of the vertical bracket 3. The sprinkler mounting structure further includes a mounting bracket 4 which has a mounting hole 4b into which the latitudinal support unit 2 is inserted through a mouth 4a. The sprinkler mounting structure further includes a sprinkler reducer 7 which is inserted into and fastened to the mounting bracket 4 by a wing bolt 4d. The sprinkler reducer 7 is coupled at a side thereof to a fire water pipe 5 and coupled at the other side thereof to a sprinkler head 6.

However, in the conventional sprinkler mounting structure, to mount the latitudinal support unit 2 to the longitudinal support unit 1, the locking bolt 3a must be tightened into both the vertical bracket 3 and the longitudinal support unit 1, and as well, the wing bolt 4d must be tightened into the mounting bracket 4 such that the mounting bracket 4 is tightly closed to hold the sprinkler reducer 7 inserted into the mounting bracket 4. Accordingly, a long time is required to mount both the latitudinal support unit 2 and the mounting bracket 7 to the longitudinal support unit 1. Furthermore, the sprinkler head 6 must be coupled to the sprinkler reducer 7 after the sprinkler reducer 7 is mounted to the latitudinal support unit 2 using the mounting bracket 4. Therefore, the conventional sprinkler mounting process is inefficient, compared with a sprinkler mounting process in which a sprinkler reducer is mounted to a latitudinal support unit after a sprinkler head is coupled to the sprinkler reducer.

SUMMARY OF THE INVENTION

Accordingly, the present invention has been made keeping in mind the above problems occurring in the prior art, and an object of the present invention is to provide a mounting structure for sprinklers in which a latitudinal support unit includes elastic units at opposite ends thereof, so that the latitudinal support unit can be easily mounted to a longitudinal support unit merely by pushing the latitudinal support unit downwards onto the longitudinal support unit.

Another object of the present invention is to provide a mounting structure for sprinklers which is capable of reliably fastening a sprinkler reducer to a mounting bracket, mounted to the latitudinal support unit, simply by rotating a locking unit on the mounting bracket in a predetermined direction.

A further object of the present invention is to provide a mounting structure for sprinklers which is able to easily mounting the sprinkler reducer to the latitudinal support unit after coupling the sprinkler reducer to both a fire water pipe and a sprinkler head.

In an aspect, the present invention provides a mounting structure for sprinklers, including: a pair of longitudinal support units, with a first stop part provided along an upper end of each of the longitudinal support units; and a latitudinal support unit having bent parts at opposite ends thereof. Each of the bent parts has a first lower stopper formed by cutting a part of a lower end of each of the bent parts of the latitudinal support unit and bending the cut part in a predetermined direction, a first upper stopper provided at a predetermined position spaced apart from the first lower stopper by a height of the first stop part of the longitudinal support unit, and a pair of first notches formed at predetermined positions on the latitudinal support unit over the first upper stopper. The sprinkler mounting structure further includes a first elastic unit fastened at opposite ends thereof to the first notches of the latitudinal support unit, the first elastic unit being bent downwards and extending to a predetermined length, with a first bent hook provided on a lower portion of the first elastic unit and being elastically hooked to a lower portion of the first stop part of the longitudinal support unit; and a sprinkler head mounting means coupled to the latitudinal support unit to hold a sprinkler head.

In another aspect, the present invention provides a mounting structure for sprinklers, including: a longitudinal support unit, with a first stop part provided along an upper end of the longitudinal support unit; a latitudinal support unit coupled at a predetermined position thereof to the upper end of the longitudinal support unit; a mounting bracket, having a mounting hole defined at a predetermined position on the mounting bracket to allow the mounting bracket to be fitted over the latitudinal support unit, a mouth defined at a first end of the mounting bracket, and a reducer holding part provided at a second end of the mounting bracket in a predetermined shape to correspond to a shape of a cross-section of a sprinkler reducer; and a locking unit coupled to the first end of the mounting bracket at which the mouth is defined. The locking unit has a compressing part bent towards the latitudinal support unit based on a rotational axis of the locking unit, so that, when the locking unit is rotated around the rotational axis thereof in a predetermined direction while the sprinkler reducer is inserted into the holding part of the mounting bracket, the mounting bracket is moved by the compressing part towards the latitudinal support unit, thus supporting the sprinkler reducer between the holding part of the mounting bracket and the latitudinal support unit.

The sprinkler head mounting means may include: a mounting bracket, having a pair of arms with a mounting space defined between the arms, a mouth defined between first ends of the arms, a support part provided at second ends of the arms, so that the latitudinal support unit is inserted into the mounting space through the mouth such that the latitudinal support unit is in contact with the support part, and a pair of coupling hooks provided on the first ends of the arms; and a locking unit, having a compressing part bent towards the latitudinal support unit, with a coupling space defined in the compressing part to receive the coupling hooks of the mounting bracket therein, so that, when the locking unit is rotated around points through which a rotational axis of the locking unit passes, the mounting bracket is moved by the compressing part towards the latitudinal support unit, thus supporting a sprinkler reducer between the mounting bracket and the latitudinal support unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
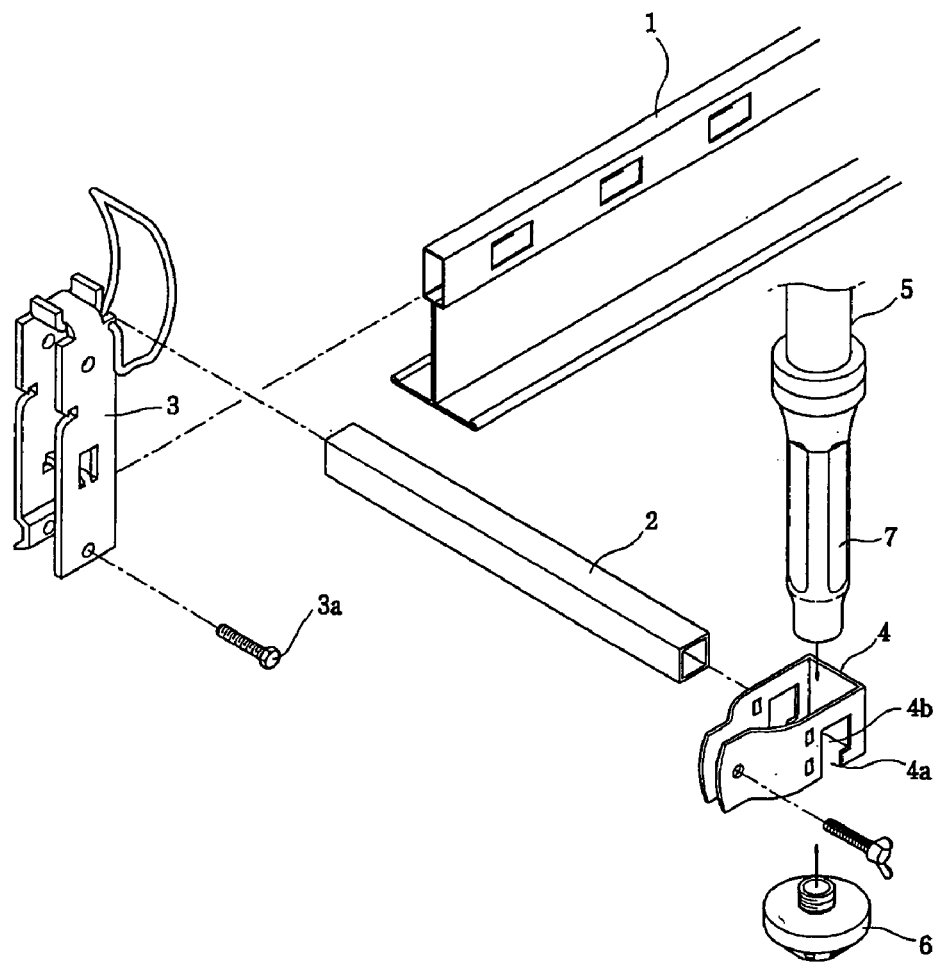
FIG. 1 is an exploded perspective view showing a conventional mounting structure for sprinklers.
Figure 2:
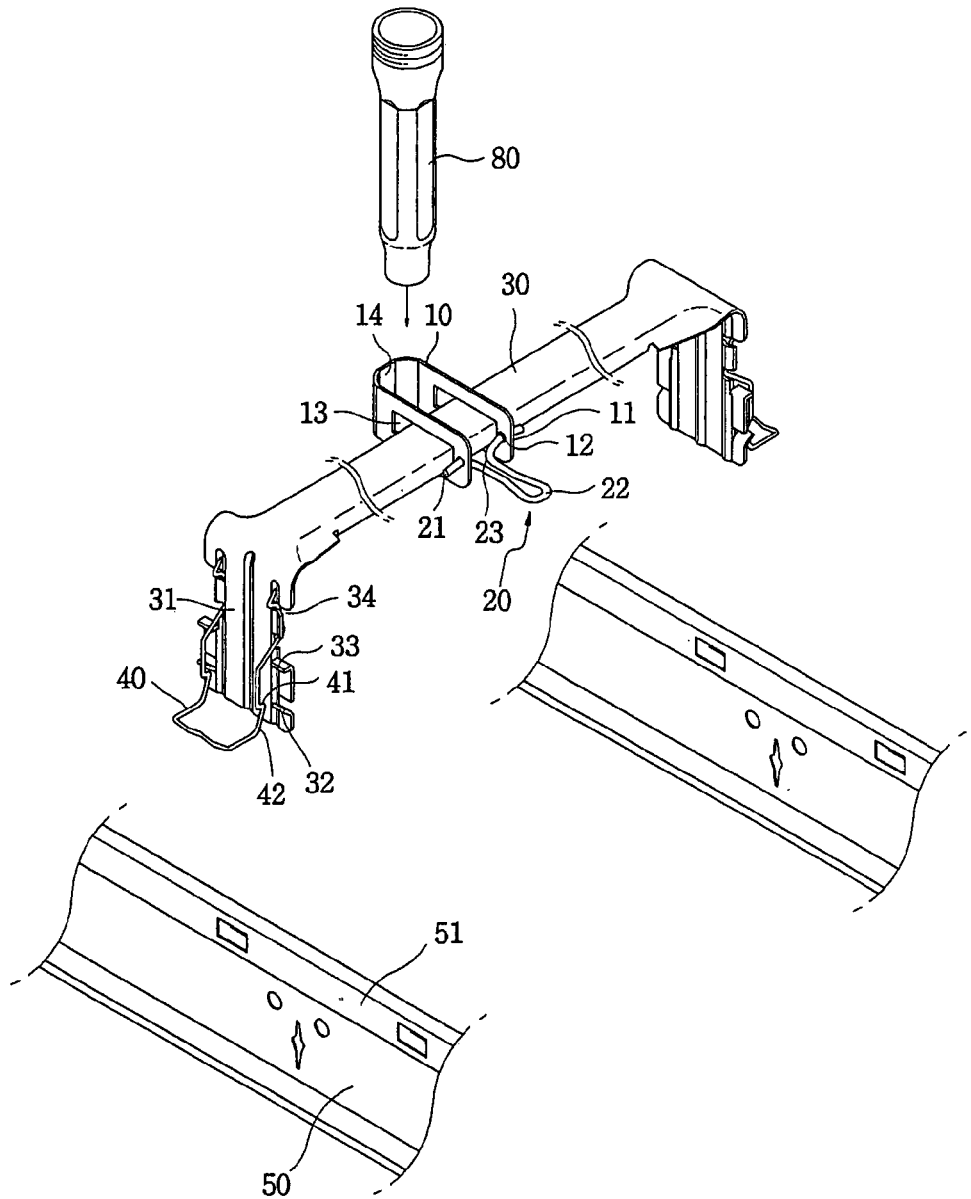
FIG. 2 is an exploded perspective view of a mounting structure for sprinklers, according to a first embodiment of the present invention.
Figure 3:
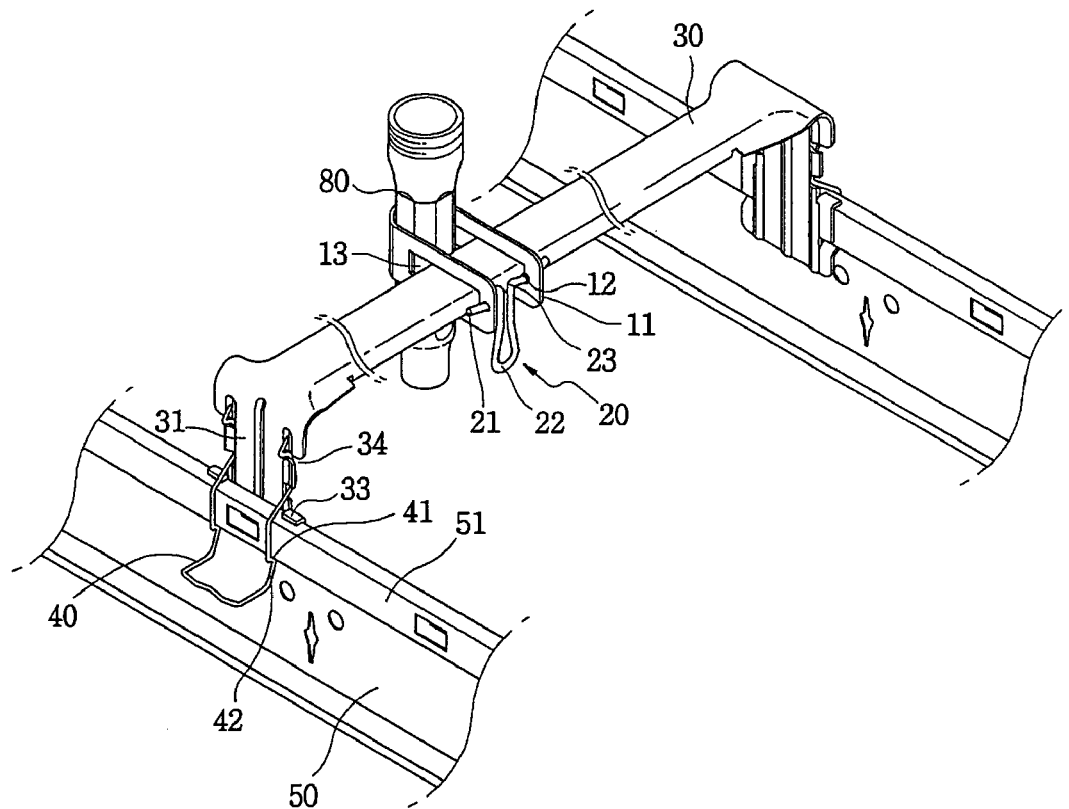
FIG. 3 is a perspective view of the assembled sprinkler mounting structure of FIG. 2.
Figure 4A:
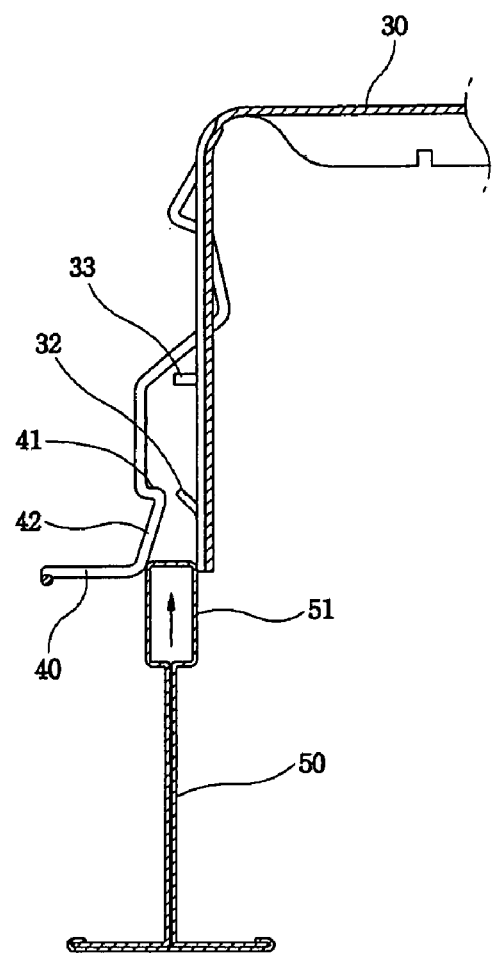
FIGS. 4A and 4B are sectional views showing a coupling of a latitudinal support unit to a longitudinal support unit of the sprinkler mounting structure of FIG. 3.
Figure 4B:
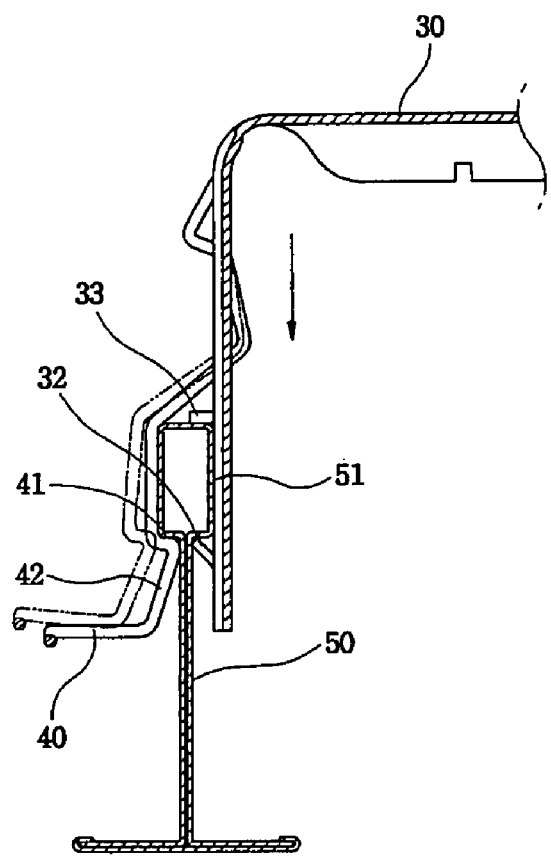
Figure 5A:
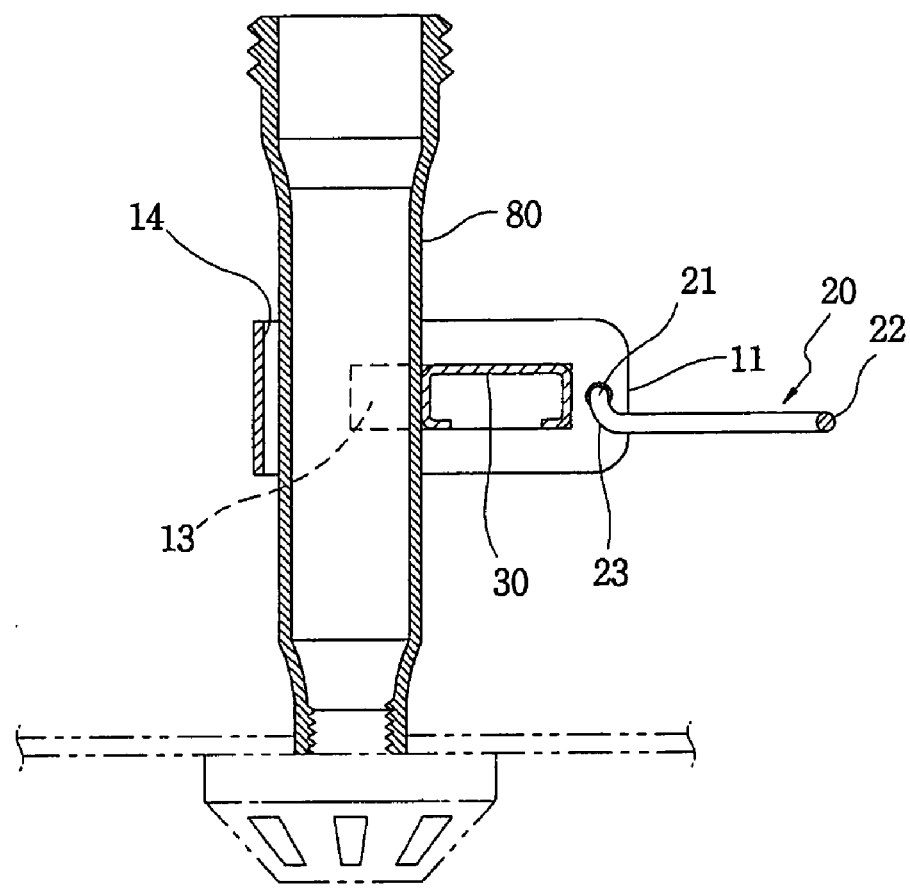
FIGS. 5A and 5B are sectional views showing a process of mounting a sprinkler reducer to the latitudinal support unit of the sprinkler mounting structure of FIG. 3 using a reducer mounting means.
Figure 5B:
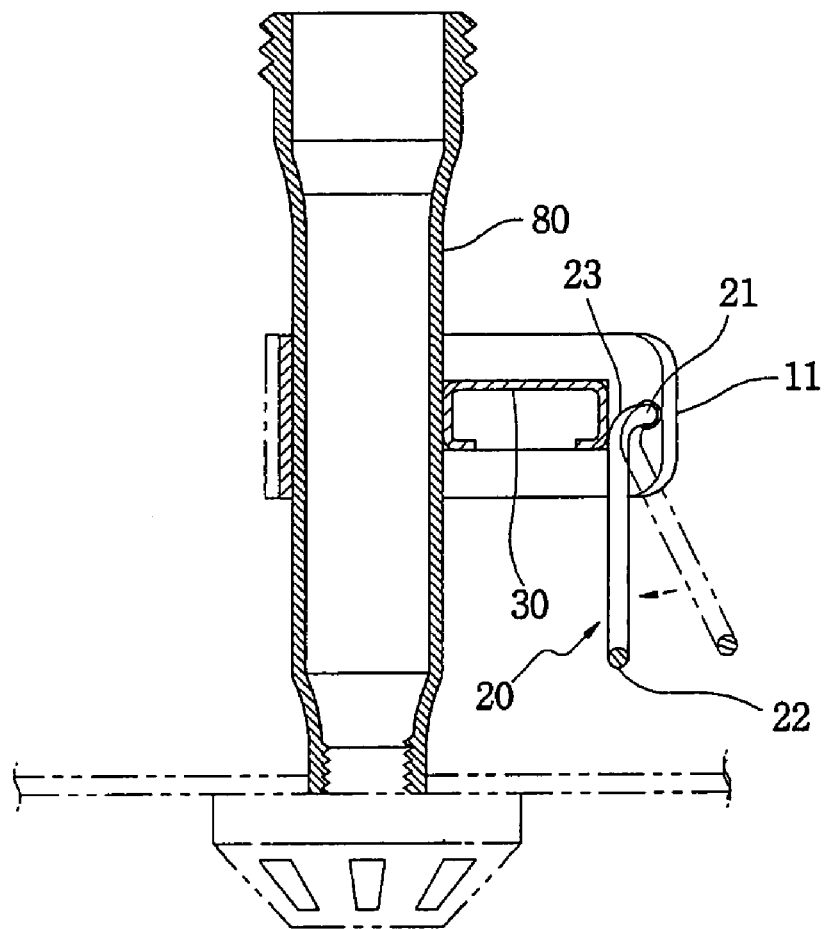
Figure 6A:
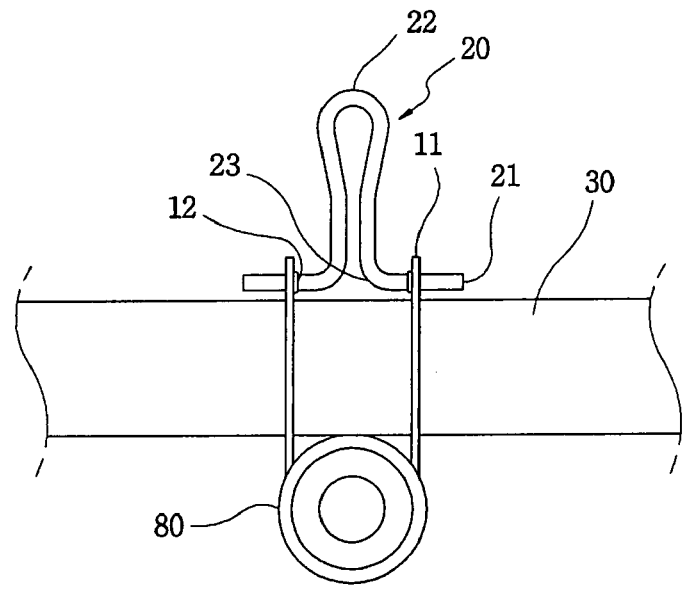
FIGS. 6A and 6B are plan views of the sprinkler mounting structure in states of FIGS. 5A and 5B, respectively.
Figure 6B:
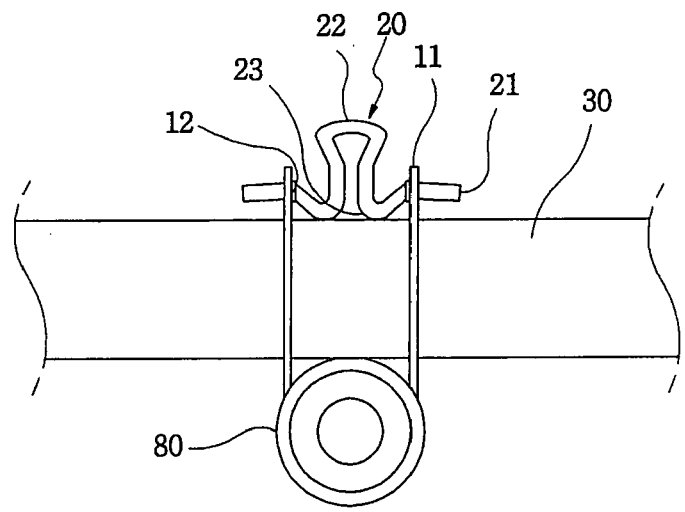

Hereinafter, embodiments of the present invention will be described in detail with reference to the attached drawings.

FIGS. 2 through 6B show a mounting structure for sprinklers according to a first embodiment of the present invention. As shown in FIGS. 2 through 6B, the sprinkler mounting structure according to the first embodiment includes a mounting bracket 10 having a locking unit 20, a latitudinal support unit 30 to which the mounting bracket 10 is movably coupled, and a pair of longitudinal support units 50 which are coupled to opposite ends of the latitudinal support unit 30 by first elastic units 40 which are provided at opposite ends of the latitudinal support unit 30.

The mounting bracket 10 is formed by bending a metal plate having a predetermined thickness and width. The mounting bracket 10 has a mouth 11 at a first end thereof, and a through hole 12 which is provided on each of opposite sidewalls of the mounting bracket 10 adjacent to the mouth 11. The mounting bracket 10 further has a mounting hole 13 which is formed on each sidewall of the mounting bracket 10 at a predetermined position near each through hole 12 to allow the mounting bracket 10 to be fitted over the latitudinal support unit 30, and a reducer holding part 14 which is provided at a second end of the mounting bracket 10 in a predetermined shape to correspond to the shape of a cross-section of a sprinkler reducer 80.

The width of the mounting hole 13 is greater than that of the latitudinal support unit 30, so that, when the locking unit 20 is rotated in a predetermined direction while the sprinkler reducer 80 is inserted into the holding part 14 of the mounting bracket 10, the mounting bracket 13 is movable towards the latitudinal support unit 30.

The reducer holding part 14 is shaped in a circular or angled shape to correspond to the shape of the cross-section of the sprinkler reducer 80.

The distance between the reducer holding part 14 and the through hole 12 corresponds to the sum of a diameter of the sprinkler reducer 80, the width of the latitudinal support unit 30 and the distance, determined by the inclination of a compressing part 23 of the locking unit 20, between the latitudinal support unit 30 and the through hole 12.

The locking unit 20 is made by bending a steel wire. An insertion part 21 is formed at each of opposite ends of the locking unit 20 to pass through each through hole 12 of the mounting bracket 10. A handle 22 is formed at an intermediate portion of the locking unit 20 to allow a user to hold the handle 22 and rotate the locking unit 20. The compressing part 23 is provided between the insertion part 21 and the handle 22 and is bent towards the latitudinal support unit 30 based on the rotational axis passing through the through holes 12 of the mounting bracket 10. Therefore, when the handle 22 is rotated around the rotational axis in the predetermined direction while the sprinkler reducer 80 is inserted into the holding part 14 of the mounting bracket 10, the compressing part 23 comes into close contact with the latitudinal support unit 30 to move the mounting bracket 10 towards the latitudinal support unit 30, thus supporting the sprinkler reducer 80 between the reducer holding part 14 of the mounting bracket 10 and the latitudinal support unit 30.

In other words, when the user holds the handle 22 of the locking unit 20, which protrudes outwards, and rotates the locking unit 20 while the sprinkler reducer 80 is inserted into the reducer holding part 14, the insertion parts 21, which are inserted in the through holes 12 of the mounting bracket 10, rotate around the through holes 12. At this time, the compressing part 23 of the locking unit 20, which protrudes outwards from the rotational axis of the locking unit 20 passing through the through holes 12, serves to pull the mounting bracket 10 towards the latitudinal support unit 30, thus reliably supporting the sprinkler reducer 80 between the reducer holding part 14 and the latitudinal support unit 30.

The latitudinal support unit 30 is made of a predetermined member having a special cross-section. In a state in which the mounting bracket 10 is fitted over the member constituting the latitudinal support unit 30, each of opposite ends of the member is bent downwards in a spread state, thus forming a bent part 31. Each bent part 31 includes a first lower stopper 32 which is formed by cutting a part of each of both sides of a lower end of the bent part 31 and bending the cut part in a predetermined direction. Each bent part 31 further includes a first upper stopper 33 which is provided at a predetermined position spaced apart from each first lower stopper 32 by the height of a first stop part 51 of the longitudinal support unit 50. A pair of first notches 34 is formed at predetermined positions on the bent part 31 over the first upper stoppers 33.

The first elastic unit 40 is made by bending a steel wire. In detail, the first elastic unit 40 is fastened at opposite ends thereof to the first notches 34 of each bent part 31 of the latitudinal support unit 30. Furthermore, the first elastic unit 40 is bent downwards and extends to a predetermined length. A first bent hook 41 is provided on a lower portion of the first elastic unit 40 to be elastically hooked to a lower part of the first stop part 51 of the longitudinal support unit 50. In addition, a first inclined part 42 is provided on the lower part of the first elastic unit 40, so that, when the latitudinal support unit 30 is fitted over the longitudinal support unit 50, the first stop part 51 of the longitudinal support unit 50 is easily inserted between the latitudinal support unit 30 and the first elastic unit 40.

Each longitudinal support unit 50 has a T-shaped cross-section. The first stop part 51, which is held between the first elastic unit 40 and the bent part 31 of the latitudinal support unit 30, is provided along an upper end of the longitudinal support unit 50.

FIGS. 7 through 10B are views showing a mounting structure for sprinklers according to a second embodiment of the present invention. As shown in FIGS. 7 through 10B, in the second embodiment, a mounting bracket 10A includes a pair of bracket arms with a mounting space 13A defined between the bracket arms. The mounting bracket 10A further includes a mouth 13C which is defined between first ends of the bracket arms, and a support part 13B which is provided at second ends of the bracket arms, so that the latitudinal support unit 30 is inserted into the mounting space 13A through the mouth 13C such that the latitudinal support unit 30 is in contact with the support part 13B. The mounting bracket 10A further includes a pair of coupling hooks 13D which is provided on the first ends of the bracket arms. A locking unit 20A, which is coupled to the mounting bracket 10A, includes a compressing part 23A which is bent towards the latitudinal support unit 30. A coupling space 21A is defined in the compressing part 23A to receive the coupling hooks 13D of the mounting bracket 10A therein. When the locking unit 20A coupled to the mounting bracket 10A is rotated around points through which a rotational axis of the locking unit 20A passes, the mounting bracket 10A is moved by the compressing part 23A towards the latitudinal support unit 30, thus supporting a sprinkler reducer 80 between the mounting bracket 10A and the latitudinal support unit 30.

Figure 7:
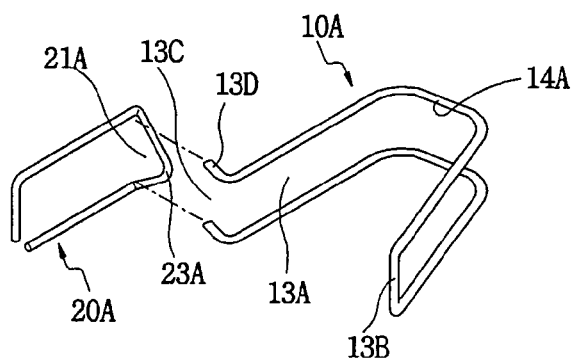
FIG. 7 is an exploded perspective view showing a mounting bracket and a locking unit of a mounting structure for sprinklers, according to a second embodiment of the present invention.
Figure 8A:
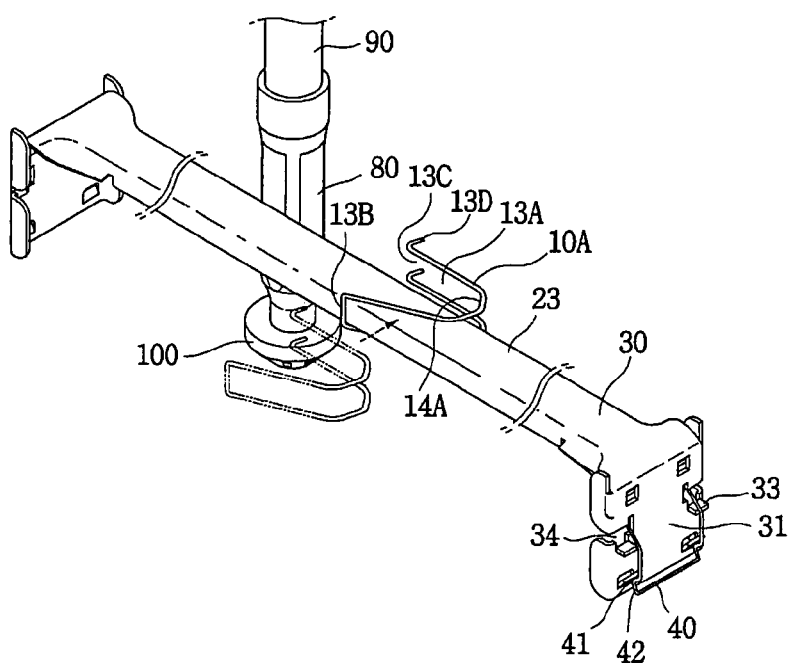
FIGS. 8A through 8D are perspective views showing a process of mounting a sprinkler reducer to a latitudinal support unit of the sprinkler mounting structure using both the mounting bracket and the locking unit of FIG. 7.
Figure 8B:
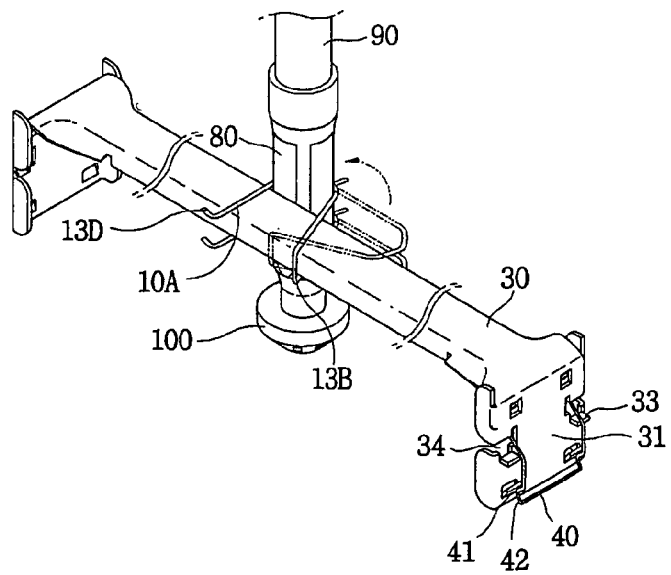
Figure 8C:
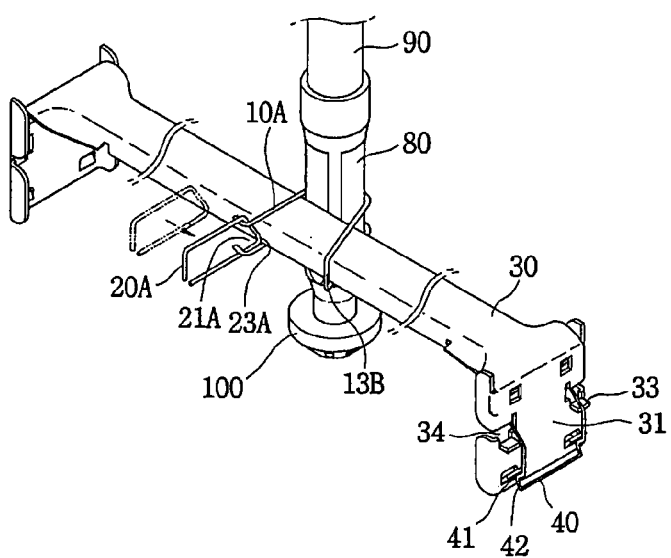
Figure 8D:
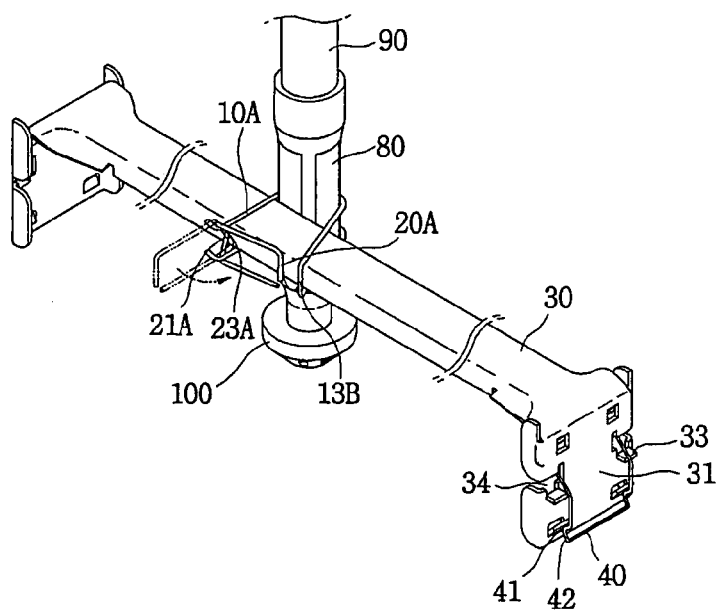
Figure 10A:
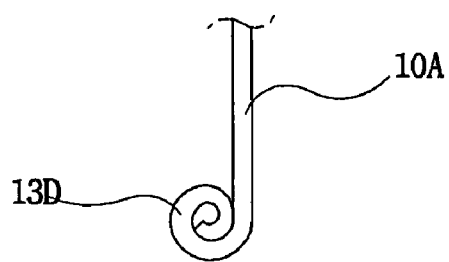
FIGS. 10A and 10B are views showing examples of the shape of a coupling hook of the mounting bracket of FIG. 7.
Figure 10B:
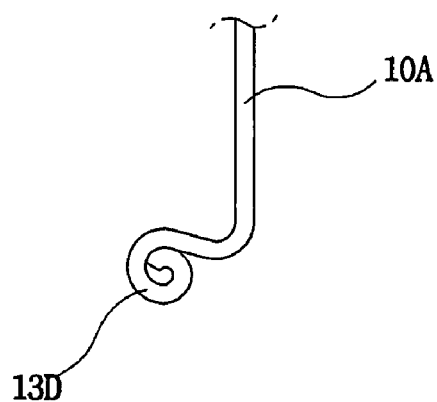

FIGS. 10A and 10B are views showing examples of the shape of each coupling hook 13D of the mounting bracket 10A of FIG. 7. As shown in FIGS. 10A and 10B, to promote the safety of workers, each coupling hook 13D of the mounting bracket 10A may be formed by rolling each of the first ends of the bracket arms of the mounting bracket 10A such that the ends of the bracket arms are not exposed to the outside.

Figure 11:
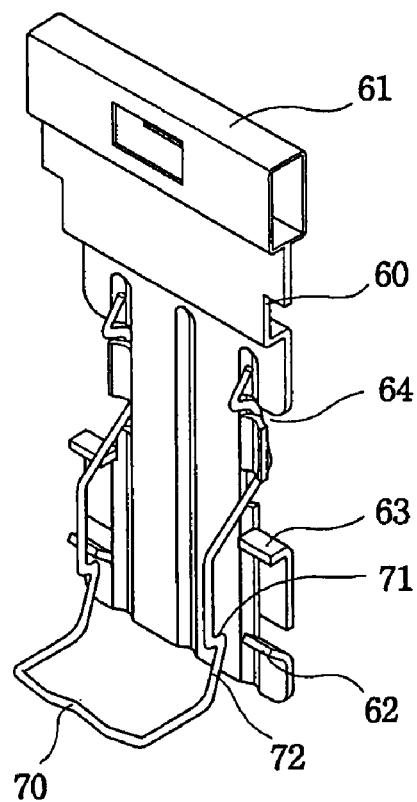
FIG. 11 is a perspective view of an extension support unit of the sprinkler mounting structure of the present invention which is used to control the latitudinal support unit mounting height.
Figure 12:
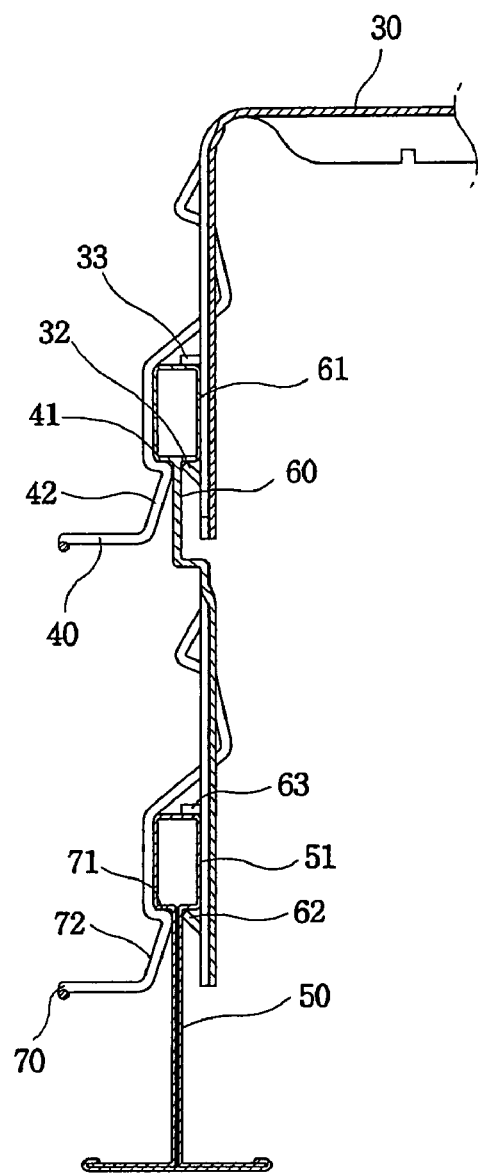
FIG. 12 is a sectional view showing a state in which the extension support unit of FIG. 11 is mounted to the longitudinal support unit so as to support the latitudinal support unit thereon.

FIGS. 11 and 12 show both an extension support unit 60 and a second elastic unit 70 of the sprinkler mounting structure of the present invention which are used to control the latitudinal support unit mounting height. The extension support unit 60 includes a second stop part 61 which is provided along an upper end of the extension support unit 60 and has the same height as the height of the first stop part 51 of the longitudinal support unit 50. The extension support unit 60 further includes a second lower stopper 62 which is formed by cutting a part of each of both sides of a lower end of the extension support unit 60 and bending the cut part in a predetermined direction. The extension support unit 60 further includes a second upper stopper 63 which is provided at a predetermined position spaced apart from each second lower stopper 62 by the height of the first stop part 51 of the longitudinal support unit 50, and a pair of second notches 64 which are formed at predetermined positions over the second upper stopper 63 on the extension support unit 60.

The second elastic unit 70 is made by bending a steel wire in the same manner as that described for the first elastic unit 40. In detail, opposite ends of the second elastic unit 70 are fastened to the second notches 64 of the extension support unit 60. Furthermore, the second elastic unit 70 is bent downwards and extends to a predetermined length. A second bent hook 71 is provided on a lower part of the second elastic unit 70 and is elastically hooked to a lower end of the second stop part 61 of the extension support unit 60. In addition, a second inclined part 72 is provided on the lower part of the second elastic unit 70, so that, when the extension support unit 60 is coupled to the longitudinal support unit 50, the first stop part 51 of the longitudinal support unit 50 is easily inserted between the extension support unit 60 and the second elastic unit 70.

Figure 13A:
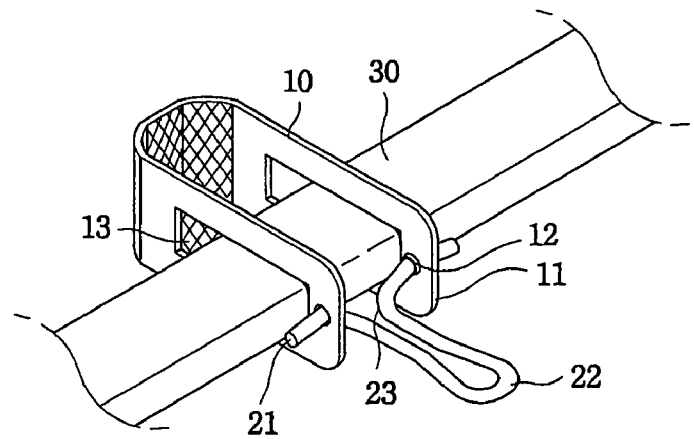
FIGS. 13A through 13C are views showing a holding part of the mounting bracket of the sprinkler mounting structure, according to modifications of the first embodiment of FIG. 3.
Figure 13B:
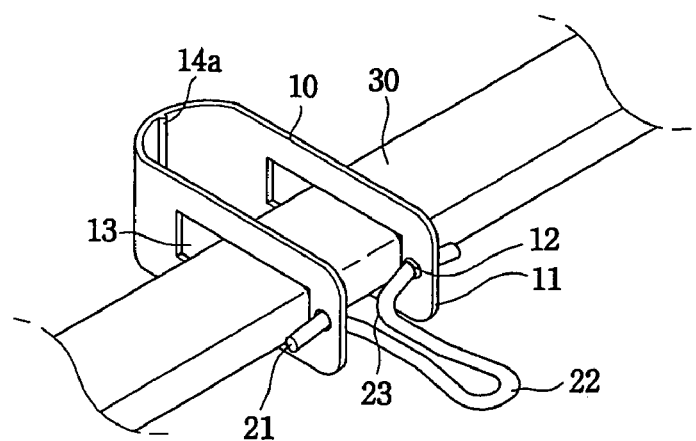
Figure 13C:
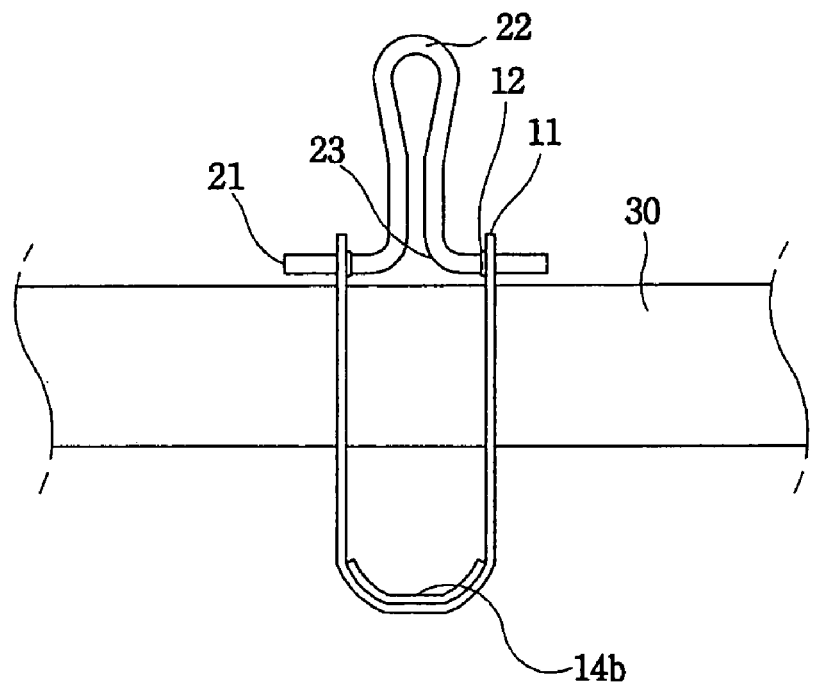

FIGS. 13A through 13C are views showing holding parts 14 of mounting brackets 10 to more reliably couple the sprinkler reducer to the latitudinal support unit 30, according to modifications of the first embodiment of the present invention. FIG. 13A shows a knurled portion provided in a holding part 14 of a mounting bracket 10. FIG. 13B shows a vertically elongated protrusion 14a provided in a holding part 14 of a mounting bracket 10. In the case of FIG. 13B, the sprinkler reducer 80 has a vertically elongated groove at a predetermined position to correspond to the vertically elongated protrusion 14a of the holding part 14. FIG. 13C shows a horizontally elongated protrusion 14b provided in a holding part 14 of a mounting bracket 10. In the case of FIG. 13C, the sprinkler reducer 80 has a horizontally elongated groove at a predetermined position to correspond to the horizontally elongated protrusion 14b of the holding part 14.

In the present invention having the above-mentioned structure, to couple the latitudinal support unit 30, to which the mounting bracket 10 is movably coupled, to the pair of longitudinal support units 50 mounted on the ceiling plate of the building, the latitudinal support unit 30 is placed over the longitudinal support units 50 such that each longitudinal support unit 50 is positioned between each bent part 31 of the latitudinal support unit 30 and the first inclined part 42 of each first elastic unit 40. Thereafter, when the latitudinal support unit 30 is pushed downwards, a gap occurs between the first elastic unit 40 and the bent part 31. Consecutively, when the latitudinal support unit 30 is further moved downwards, both the first bent hook 41 of the first elastic unit 40 and the first lower stoppers 32 of the bent part 31 are hooked to both sides of the lower end of the first stop part 51 of the longitudinal support unit 50. Simultaneously, an upper end of the first stop part 51 comes into close contact with the first upper stoppers 33 of the bent part 31. Thus, the latitudinal support unit 30 is reliably mounted to the longitudinal support units 50 (see, FIG. 4B).

To mount the latitudinal support unit 30 higher on the longitudinal support units 50, the extension support unit 60 is interposed between each bent part 31 of the latitudinal support unit 30 and each longitudinal support unit 50. In detail, first, the extension support unit 60 is placed between each bent part 31 of the latitudinal support unit 30 and the first inclined part 42 of each first locking unit 40. Thereafter, the extension support unit 60 is pushed toward the latitudinal support unit 30, so that both the first bent hook 41 of the first elastic unit 40 and the first lower stoppers 32 of the bent part 31 are hooked to both sides of the lower end of the second stop part 61 of the extension support unit 60. Simultaneously, an upper end of the second stop part 61 comes into close contact with the first upper stoppers 33 of the bent part 31. As such, after the extension support units 60 are coupled to the latitudinal support unit 30, the extension support units 60 are placed over the longitudinal support units 50 such that each longitudinal support unit 50 is positioned between each extension support unit 60 and the second inclined part 72 of each second elastic unit 70. Thereafter, the extension support units 60 are pushed downwards along with the latitudinal support unit 30, so that both the second bent hook 71 of each second elastic unit 70 and the second lower stoppers 62 of each extension support unit 60 are hooked to both sides of the lower end of the first stop part 51 of each longitudinal support unit 50. Simultaneously, the upper end of the first stop part 51 comes into close contact with the second upper stoppers 63 of the extension support unit 60. Then, the latitudinal support unit mounting height is increased by the height of the extension support unit 60 (see, FIG. 12).

In the present invention, because the relatively small mounting bracket 10 is handled when coupled to the latitudinal support unit 30, there is no fear that the mounting bracket 10 will become lost.

In the case of the first embodiment, after the latitudinal support unit 30 is mounted to the longitudinal support units 50, a fire water pipe 90 is connected to an end of the sprinkler reducer 80. In this state, the mounting bracket 10, which is movably fitted over the latitudinal support unit 30 through the mounting holes 13, is moved to a predetermined position at which the sprinkler reducer 80 is mounted to the mounting bracket 10.

Thereafter, the sprinkler reducer 80 coupled to the fire water pipe 90 is inserted between the holding part 14 of the mounting bracket 10 and the latitudinal support unit 30. The sprinkler reducer mounting height is controlled. Thereafter, the user holds the handle 22 of the locking unit 20 and rotates the locking unit 20 around the insertion parts 21 thereof in the predetermined direction. Then, the compression part 23 of the locking unit 20 comes into close contact with the latitudinal support unit 30. Consecutively, the mounting bracket 10 is moved by the compression part 23 and by the rotating force of the locking unit 20 towards the latitudinal support unit 30.

When the mounting bracket 10 is moved by the compression part 23 towards the latitudinal support unit 30, the holding part 14 holds the sprinkler reducer 80 in conjunction with the latitudinal support unit 30. Thereby, the sprinkler reducer 80 is firmly mounted to the ceiling plate. In this state, a sprinkler head 100 is coupled to the other end of the sprinkler reducer 80, thus completing the sprinkler mounting process.

In the case of the second embodiment, the sprinkler reducer 80, which is coupled at an end thereof to a fire water pipe 90, is vertically placed at a predetermined position to be-in contact with a side of the latitudinal support unit 30.

In this state, to mount the mounting bracket 10A to the latitudinal support unit 30A, the latitudinal support unit 30A is horizontally inserted into the mounting space 13A of the mounting bracket 10A through the mouth 13C. At this time, the first end of the bracket arms, defining the mouth 13C and the mounting space 13A, is positioned outside the sprinkler reducer 80 (see, FIG. 8A).

Thereafter, the mounting bracket 10A, fitted over the latitudinal support unit 30, is rotated around the support part 13B so that the bracket arms surround the sprinkler reducer 80 and the other side of the sprinkler reducer 80 passes through the mouth 13C. Then, a holding part 14A of the mounting bracket 10A comes into close contact with an outer surface of the sprinkler reducer 80, and the coupling hooks 13D are on the same straight line as the support part 13B (see, FIG. 8B).

Figure 9:
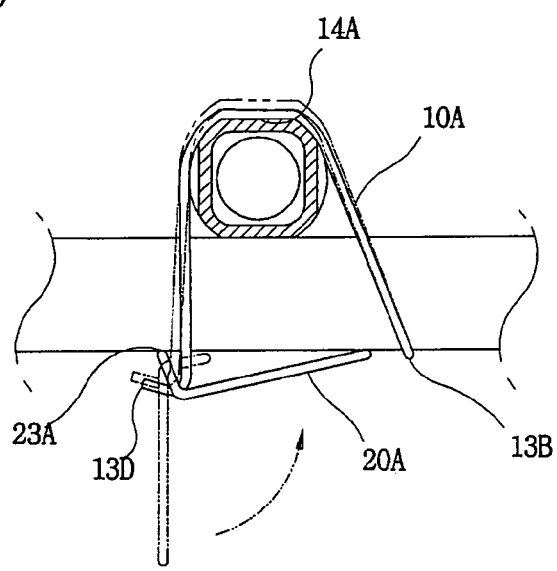
FIG. 9 is a plan view showing the sprinkler reducer mounted to the latitudinal support unit by the relationship between the mounting bracket and the locking unit of FIG. 7.

Thereafter, the locking unit 20A is coupled to the mounting bracket 10A such that the coupling hooks 13D of the mounting bracket 10A are inserted into the coupling space 21A of the locking unit 20A. The locking unit 20A is rotated around the coupling hooks 13D towards the latitudinal support unit 30. Then, as shown in FIG. 9, the compressing part 21A of the locking unit 20A compresses the latitudinal support unit 30 so that the mounting bracket 10A is pulled towards the latitudinal support unit 30, thus reliably fastening the sprinkler reducer 80 to the latitudinal support unit 30.

As described above, the present invention provides a mounting structure for sprinklers in which a latitudinal support unit is mounted to a pair of longitudinal support units by pushing downwards the latitudinal support unit which is placed over the longitudinal support units, and in which a mounting bracket is movably coupled to the latitudinal support unit, such that the position of the mounting bracket is controlled along the latitudinal support unit. Therefore, in the present invention, a sprinkler reducer is reliably mounted to the latitudinal support unit by the mounting bracket through a simple process of merely rotating a locking unit, coupled to the mounting bracket. As such, the present invention makes it possible for the latitudinal support unit and the sprinkler reducer, which are structures to mount a sprinkler, to be rapidly and reliably mounted at desired positions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mounting structure for sprinklers, comprising:
   a pair of longitudinal support units, with a first stop part provided along an upper end of each of the longitudinal support units;
   a latitudinal support unit having bent parts at opposite ends thereof, each of the bent parts comprising:
      a first lower stopper formed by cutting a part of a lower end of each of the bent parts of the latitudinal support unit and bending the cut part in a predetermined direction;
      a first upper stopper provided at a predetermined position spaced apart from the first lower stopper by a height of the first stop part of the longitudinal support unit; and
      a pair of first notches formed at predetermined positions on the latitudinal support unit over the first upper stopper;

a first elastic unit fastened at opposite ends thereof to the first notches of the latitudinal support unit, the first elastic unit being bent downwards and extending to a predetermined length, with a first bent hook provided on a lower portion of the first elastic unit and being elastically hooked to a lower portion of the first stop part of the longitudinal support unit; and sprinkler head mounting means coupled to the latitudinal support unit to hold a sprinkler head.

2. The mounting structure for sprinklers as set forth in claim 1, wherein the sprinkler head mounting means comprises:

a mounting bracket, comprising:
 a mounting hole to allow the mounting bracket to be fitted over the latitudinal support unit;
 a mouth defined at a first end of the mounting bracket; and
 a reducer holding part provided at a second end of the mounting bracket in a predetermined shape to correspond to a shape of a cross-section of a sprinkler reducer; and
a locking unit coupled to the first end of the mounting bracket at which the mouth is defined, the locking unit comprising:
 a compressing part bent towards the latitudinal support unit based on a rotational axis of the locking unit, so that, when the locking unit is rotated around the rotational axis thereof in a predetermined direction while the sprinkler reducer is inserted into the holding part of the mounting bracket, the mounting bracket is moved by the compressing part towards the latitudinal support unit, thus supporting the sprinkler reducer between the holding part of the mounting bracket and the latitudinal support unit.

3. The mounting structure for sprinklers as set forth in claim 2, wherein the mounting bracket having the mouth at the first end thereof comprises:

a through hole provided on each of opposite sidewalls of the mounting bracket adjacent to the mouth such that the mounting hole of the mounting bracket is defined near the through hole while the reducer holding part is provided at the second end of the mounting bracket in the predetermined shape to correspond to the shape of the cross-section of the sprinkler reducer.

4. The mounting structure for sprinklers as set forth in claim 2, wherein the locking unit comprises:

an insertion part provided at each of opposite ends of the locking unit to pass through each of through holes of the mounting bracket; and
a handle provided at an intermediate portion of the locking unit to allow a user to hold the handle and rotate the locking unit, wherein
the compressing part is provided between the insertion part and the handle and bent towards the latitudinal support unit based on the rotational axis passing through the through holes of the mounting bracket, so that, when the handle is rotated around the rotational axis in the predetermined direction while the sprinkler reducer is inserted into the holding part of the mounting bracket, the compressing part comes into close contact with the latitudinal support unit to move the mounting bracket towards the latitudinal support unit, thus supporting the sprinkler reducer between the reducer holding part of the mounting bracket and the latitudinal support unit.

5. The mounting structure for sprinklers as set forth in claim 1, wherein the sprinkler head mounting means comprises:

a mounting bracket, comprising:
 a pair of arms with a mounting space defined between the arms;
 a mouth defined between first ends of the arms;
 a support part provided at second ends of the arms, so that the latitudinal support unit is inserted into the mounting space through the mouth such that the latitudinal support unit is in contact with the support part; and
 a pair of coupling hooks provided on the first ends of the arms; and
a locking unit, comprising:
 a compressing part bent towards the latitudinal support unit, with a coupling space defined in the compressing part to receive the coupling hooks of the mounting bracket therein, so that, when the locking unit is rotated around points through which a rotational axis of the locking unit passes, the mounting bracket is moved by the compressing part towards the latitudinal support unit, thus supporting a sprinkler reducer between the mounting bracket and the latitudinal support unit.

6. The mounting structure for sprinklers as set forth in claim 5, wherein each of the coupling hooks of the mounting bracket is formed by rolling each of the first ends of the arms of the mounting bracket.

7. The mounting structure for sprinklers as set forth in claim 1, further comprising:

an extension support unit, comprising:
 a second stop part provided along an upper end of the extension support unit and having the same height as the height of the first stop part of the longitudinal support unit;
 a second lower stopper formed by cutting a part of each of both sides of a lower end of the extension support unit and bending the cut part in a predetermined direction;
 a second upper stopper provided at a predetermined position spaced apart from the second lower stopper by the height of the first stop part of the longitudinal support unit; and
 a pair of second notches formed at predetermined positions over the second upper stopper on the extension support unit; and
a second elastic unit fastened at opposite ends thereof to the second notches of the extension support unit, the second elastic unit being bent downwards and extending to a predetermined length, with a second bent hook provided on a lower portion of the second elastic unit and being elastically hooked to a lower portion of the second stop part of the extension support unit.

8. A mounting structure for sprinklers, comprising:

a longitudinal support unit, with a first stop part provided along an upper end of the longitudinal support unit;
a latitudinal support unit coupled at a predetermined position thereof to the upper end of the longitudinal support unit;
a mounting bracket, comprising:
 a mounting hole defined at a predetermined position on the mounting bracket to allow the mounting bracket to be fitted over the latitudinal support unit;
 a mouth defined at a first end of the mounting bracket; and a reducer holding part provided at a second end of the mounting bracket in a predetermined shape to correspond to a shape of a cross-section of a sprinkler reducer; and a locking unit coupled to the first end of the mounting bracket at which the mouth is defined, the locking unit comprising:

a compressing part bent towards the latitudinal support unit based on a rotational axis of the locking unit, so that, when the locking unit is rotated around the rotational axis thereof in a predetermined direction while the sprinkler reducer is inserted into the holding part of the mounting bracket, the mounting bracket is moved by the compressing part towards the latitudinal support unit, thus supporting the sprinkler reducer between the holding part of the mounting bracket and the latitudinal support unit.

9. The mounting structure for sprinklers as set forth in claim 8, wherein the latitudinal support unit comprises:

a bent part provided at each of opposite ends of the latitudinal support unit, comprising:

a first lower stopper formed by cutting a part of a lower end of each of the bent parts of the latitudinal support unit and bending the cut part in a predetermined direction;

a first upper stopper provided at a predetermined position spaced apart from the first lower stopper by a height of the first stop part of the longitudinal support unit; and a pair of first notches formed at predetermined positions on the latitudinal support unit over the first upper stopper; and a first elastic unit fastened at opposite ends thereof to the first notches of the latitudinal support unit, the first elastic unit being bent downwards and extending to a predetermined length, comprising:

a first bent hook provided on a lower portion of the first elastic unit and being elastically hooked to a lower portion of the first stop part of the longitudinal support unit.

10. The mounting structure for sprinklers as set forth in claim 8, wherein the mounting bracket having the mouth at the first end thereof comprises:

a through hole provided on each of opposite sidewalls of the mounting bracket adjacent to the mouth such that the mounting hole of the mounting bracket is defined near the through hole while the reducer holding part is provided at the second end of the mounting bracket in the predetermined shape to correspond to the shape of the cross-section of the sprinkler reducer.

11. The mounting structure for sprinklers as set forth in claim 8, wherein the locking unit comprises:

an insertion part provided at each of opposite ends of the locking unit to pass through each of through holes of the mounting bracket; and a handle provided at an intermediate portion of the locking unit to allow a user to hold the handle and rotate the locking unit, wherein the compressing part is provided between the insertion part and the handle and bent towards the latitudinal support unit based on the rotational axis passing through the through holes of the mounting bracket, so that, when the handle is rotated around the rotational axis in the predetermined direction while the sprinkler reducer is inserted into the holding part of the mounting bracket, the compressing part comes into close contact with the latitudinal support unit to move the mounting bracket towards the latitudinal support unit, thus supporting the sprinkler reducer between the reducer holding part of the mounting bracket and the latitudinal support unit.

12. The mounting structure for sprinklers as set forth in claim 8, wherein the mounting bracket comprises:

a pair of arms with a mounting space defined between the arms;

a mouth defined between first ends of the arms;

a support part provided at second ends of the arms, so that the latitudinal support unit is inserted into the mounting space through the mouth such that the latitudinal support unit is in contact with the support part; and a pair of coupling hooks provided on the first ends of the arms; and the locking unit comprises:

the compressing part bent towards the latitudinal support unit, with a coupling space defined in the compressing part to receive the coupling hooks of the mounting bracket therein, so that, when the locking unit is rotated around points through which a rotational axis of the locking unit passes, the mounting bracket is moved by the compressing part towards the latitudinal support unit, thus supporting the sprinkler reducer between the mounting bracket and the latitudinal support unit.

13. The mounting structure for sprinklers as set forth in claim 12, wherein each of the coupling hooks of the mounting bracket is formed by rolling each of the opposite ends of the mounting bracket.

14. The mounting structure for sprinklers as set forth in claim 8, further comprising:

a knurled portion provided in the reducer holding part of the mounting bracket.

15. The mounting structure for sprinklers as set forth in claim 8, further comprising:

a protrusion provided in the reducer holding part of the mounting bracket to correspond to a groove formed on the sprinkler reducer.

* * * * *